United States Patent
Jennings, III et al.

(10) Patent No.: US 7,975,012 B2
(45) Date of Patent: Jul. 5, 2011

(54) METHOD AND APPARATUS FOR INFERRING READ STATUS OF INSTANT MESSAGES

(75) Inventors: Raymond B. Jennings, III, Ossining, NY (US); Jason D. Lavoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/165,531

(22) Filed: Jun. 30, 2008

(65) Prior Publication Data

US 2008/0263167 A1 Oct. 23, 2008

Related U.S. Application Data

(63) Continuation of application No. 11/048,495, filed on Feb. 1, 2005, now abandoned.

(51) Int. Cl.
*G06F 15/16* (2006.01)
(52) U.S. Cl. ........................................ 709/206; 709/204
(58) Field of Classification Search .................. 709/204, 709/206
See application file for complete search history.

(56) References Cited

U.S. PATENT DOCUMENTS

| 5,835,084 A | 11/1998 | Bailey et al. |
| 6,944,628 B1 | 9/2005 | De Breed |
| 7,243,124 B1 | 7/2007 | Gardner et al. |
| 2001/0005859 A1 | 6/2001 | Okuyama et al. |
| 2002/0143916 A1 | 10/2002 | Mendiola et al. |
| 2003/0229722 A1 | 12/2003 | Beyda |
| 2004/0249776 A1 | 12/2004 | Horvitz et al. |
| 2005/0223077 A1 | 10/2005 | Vellanki et al. |
| 2005/0278425 A1 | 12/2005 | Wilsher et al. |

FOREIGN PATENT DOCUMENTS

EP 1492307 A1 12/2004

*Primary Examiner* — John Follansbee
*Assistant Examiner* — Imad Hussain

(57) ABSTRACT

In one embodiment, the present invention is a method and apparatus for inferring the read status of instant messages. One embodiment of the inventive method involves displaying the instant message on the receiver's computing device and sending a message to the sender indicating a probability with which the receiver has viewed the instant message. In one embodiment, this probability is based at least in part on an amount of the instant message that is in view on the receiver's computing device and on user input that is received by the receiver's computing device, e.g., from the receiver.

20 Claims, 4 Drawing Sheets

METHOD AND APPARATUS FOR INFERRING READ STATUS OF INSTANT MESSAGES

CROSS REFERENCE TO RELATED APPLICATIONS

This application is a continuation of U.S. patent application Ser. No. 11/048,495, filed Feb. 1, 2005 now abandoned, entitled "METHOD AND APPARATUS FOR INFERRING READ STATUS OF INSTANT MESSAGES", which is herein incorporated by reference in its entirety.

BACKGROUND

The present invention relates generally to instant messaging systems, and relates more particularly to inferring the read status of messages sent over instant messaging systems.

FIG. 1 is a schematic diagram illustrating one embodiment of an exemplary instant messaging system 100. The instant messaging system 100 allows two or more individuals using different computing devices (e.g., desktop computers, laptop computers, cellular telephones, personal digital assistants and the like) to exchange text messages in real time. Specifically, the instant messaging system 100 illustrated in FIG. 1 comprises at least one server 102 hosted by an instant messaging service and at least two user devices $104_1$-$104_n$ (hereinafter collectively referred to as "user devices 104") communicatively coupled to the server 102. In order to send an instant message 106 from a sender (e.g., user device $104_n$) to a receiver (e.g., user device $104_1$), the sender sends the instant message 106 to the server 102, which in turn delivers the instant message 106 to the receiver. The receiver may then respond by sending another instant message (not shown) via the server 102 to the sender. Alternatively, the sender and the receiver may be in direct communication with each other and exchange instant messages without the aid of the server 102.

During an exchange of instant messages, the sender may wish to determine whether the receiver has read an instant message 106 that was sent by the sender. While many commercially available instant messaging systems are capable of sending an acknowledgement 108 to the sender confirming that the instant message 106 has been received by the server 102, or that the receiver is currently typing an instant message, this acknowledgement does not indicate whether the instant message 106 has actually been read. Other instant messaging systems may provide a notification of the online status of the receiver, but this notification does not indicate whether the receiver is physically present to view the instant message 106.

Thus, there is a need in the art for a method and apparatus for inferring the read status of instant messages.

SUMMARY OF THE INVENTION

In one embodiment, the present invention is a method and apparatus for inferring the read status of instant messages. One embodiment of the inventive method involves displaying the instant message on the receiver's computing device and sending a message to the sender indicating a probability with which the receiver has viewed the instant message. In one embodiment, this probability is based at least in part on an amount of the instant message that is in view on the receiver's computing device and on user input that is received by the receiver's computing device, e.g., from the receiver.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for inferring the read status of instant messages. The method and apparatus of the present invention analyze a plurality of criteria associated with the computing device on which an instant message is received, including input from the computing device's operating system, operating system's windows manager and user, in order to assess a likelihood that the instant message has been viewed by the user of the computing device. Once this likelihood is estimated, it can be reported back to the sender of the instant message without any explicit or manual input from the user of the computing device on which the instant message was received.

Figure 1:
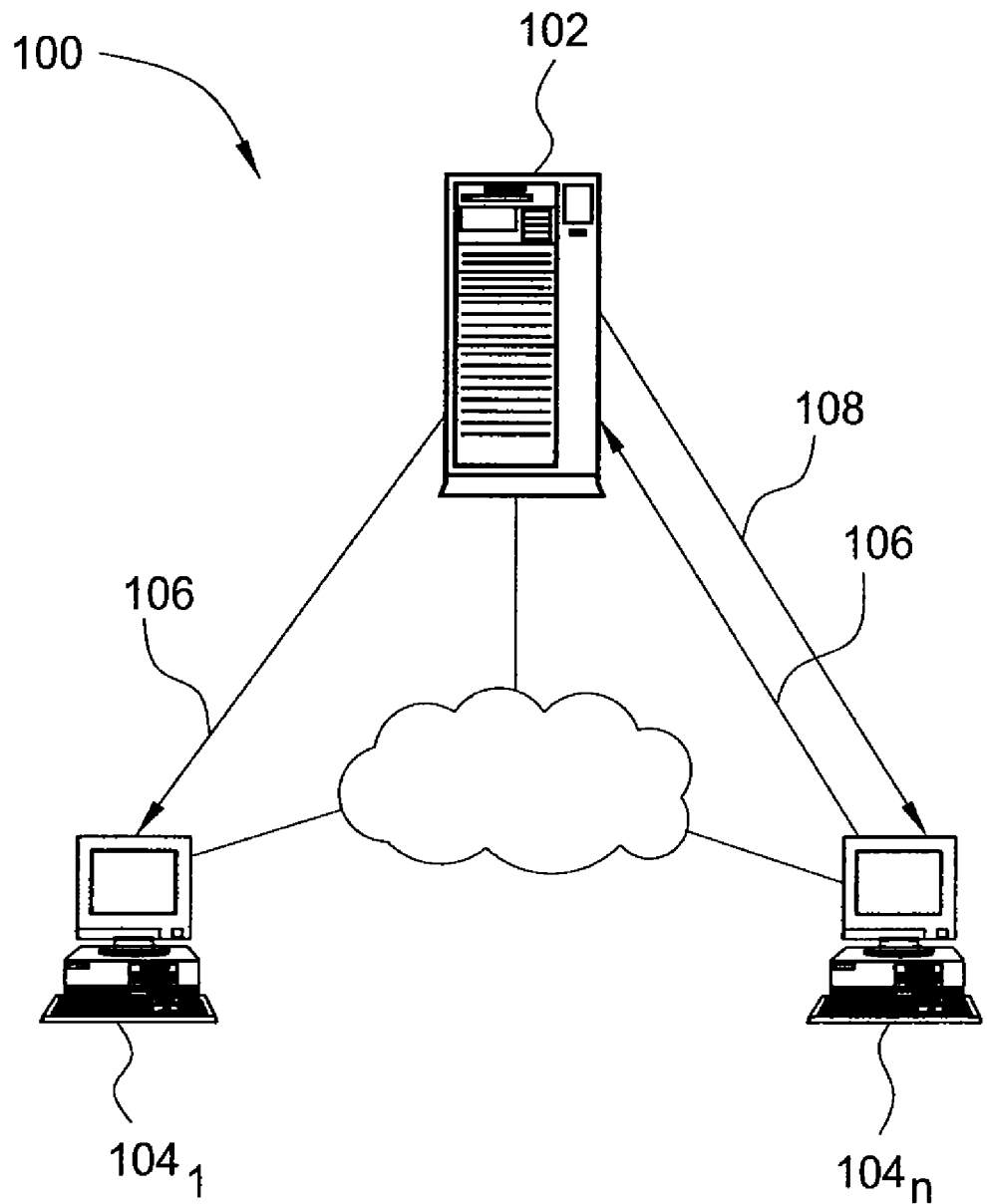
FIG. 1 is a schematic diagram illustrating one embodiment of an exemplary instant messaging system.
Figure 2:
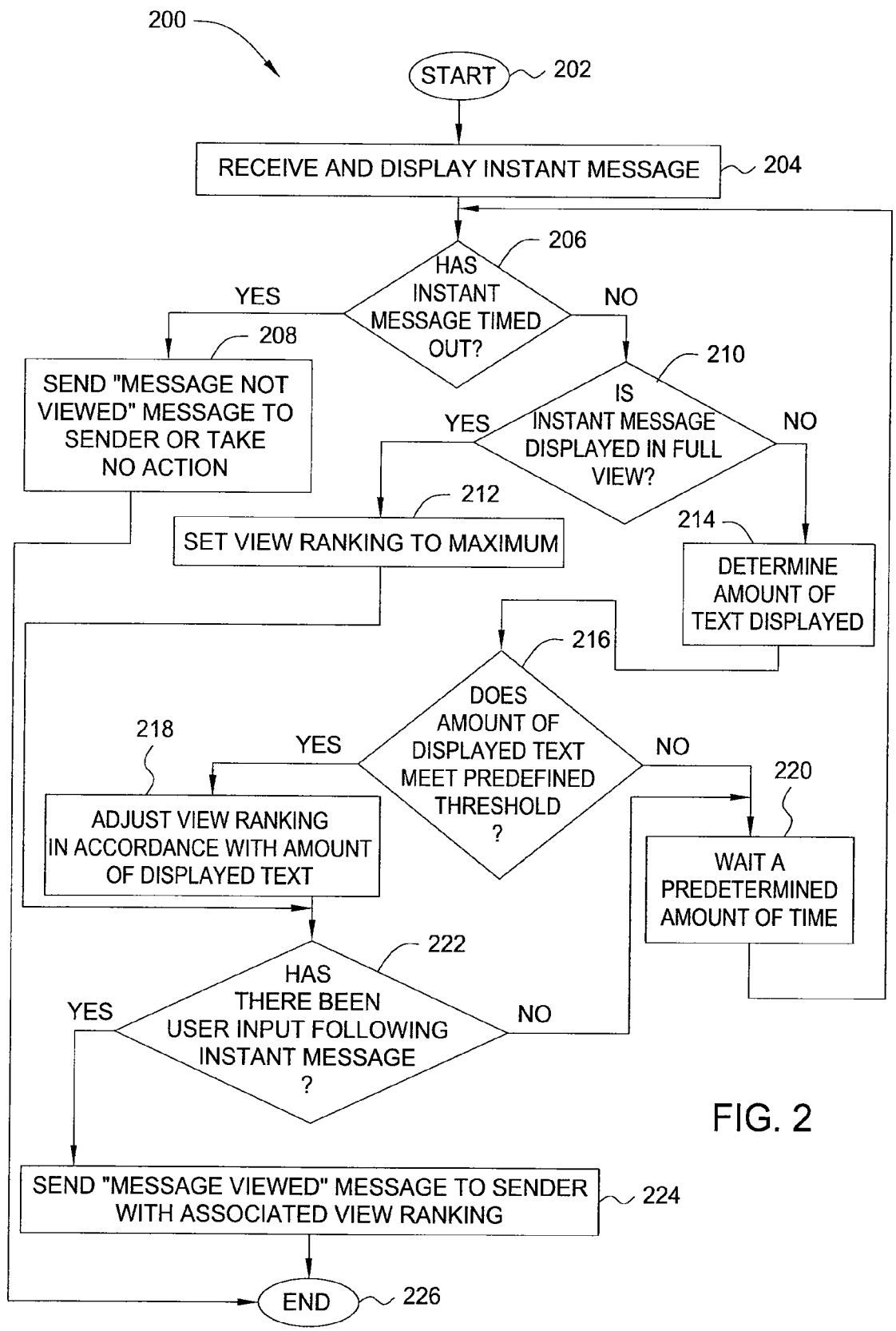
FIG. 2 is a flow diagram illustrating one embodiment of a method for inferring the read status of an instant message according to the present invention.

FIG. 2 is a flow diagram illustrating one embodiment of a method 200 for inferring the read status of an instant message according to the present invention. The method 200 may be executed at, for example, a user device that receives instant messages. The method 200 is initialized at step 202 and proceeds to step 204, where the method 200 receives an instant message and displays the instant message on the display of the receiver device for viewing by the receiver.

In step 206, the method 200 determines whether the received instant message has timed out, e.g., whether a first predefined amount of time has expired without any indication that the receiver has viewed the instant message. In one embodiment, if the method 200 determines that the instant message has timed out, the method 200 proceeds to step 208 and sends a message (e.g., directly or via a server) to the sender indicating that the instant message has not likely been viewed by the receiver. In one embodiment, the message sent in step 208 also includes a view ranking. The view ranking represents a probability or likelihood that the instant message has been viewed by the receiver. In one embodiment, the view ranking is a number that is greater than zero but less than one, where a ranking of zero indicates that the associated instant message has likely not been viewed by the receiver and a ranking of close to one indicates that the associated instant message is highly likely to have been viewed by the receiver. Alternatively, the method 200 may simply take no action in step 208 if the instant message has timed out.

However, if the method 200 determines in step 206 that the received instant message has not timed out, the method 200 proceeds to step 210 and determines whether the instant message is displayed in full view on the receiver's device display.

Figure 3:
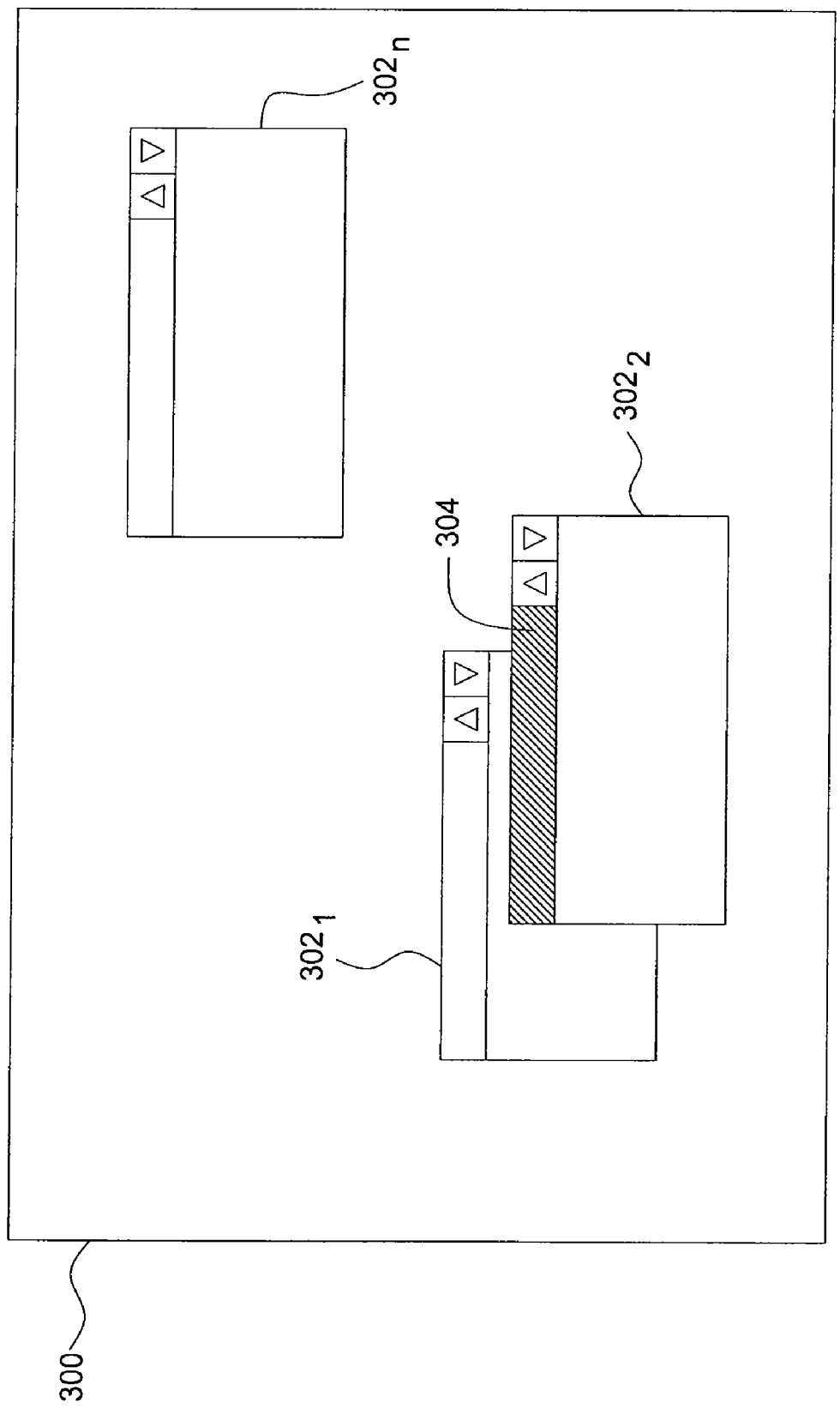
FIG. 3 is a schematic diagram illustrating the display of an exemplary user device.

FIG. 3 is a schematic diagram illustrating the display 300 of an exemplary user device. Typical windows-based operating systems (such as those commercially available from Microsoft, Apple and UNIX, among others) use a windows manager to manage the various applications (e.g., word processing programs, web browsers and the like) that may be running simultaneously on a user's device, where each running application is displayed in a respective window $302_1$-$302_n$ (hereinafter collectively referred to as "windows 302") in the display of the user device. The windows 302 run in an asynchronous manner, e.g., such that the applications associated with the windows 302 take input from the underlying operating system and from the windows manager regarding how to manage what each window 302 displays. For example, a message sent by the windows manager to a window 302 may indicate that the window 302 is going out of view on the display (e.g., completely, or, as in the case of window $302_1$, partially), or that the window 302 is coming back into view on the display (e.g., partially, as in the case of window $302_2$, or completely, as in the case of the windows $302_2$ and $302_n$). Those skilled in the art will appreciate that, as in the case of the window $302_2$, a window 302 that is partially out of view on the display may also be partially in view. These messages from the windows manager allow the windows 302 to update their respective contents (e.g., if the window 302 is in view) or to cease updating its contents (e.g., if the window 302 is not in view).

Thus, the method 200 may use the information contained in these windows manager messages to infer whether an instant message has been read by the receiver of the instant message. Referring back to FIG. 2, if the method 200 determines in step 210 that that the instant message is not displayed in full view on the receiver's device display, the method 200 proceeds to step 214 and determines exactly how much of the text of the instant message is displayed.

In step 216, the method 200 determines whether the amount of displayed text meets (or exceeds) a predefined threshold. In one embodiment, this threshold represents a minimum amount (e.g., a percentage) of the text of the instant message that must be displayed in view in order for it to be reasonably inferred that the receiver has viewed the text of the instant message. In one embodiment, this predefined threshold is approximately fifty percent of the text of the instant message, although in other embodiments the predefined threshold may be set to an alternate value, e.g., through testing for a desired result. Thus, if the method 200 determines in step 216 that the amount of the instant message text that is displayed does not at least meet this predefined threshold, the method 200 proceeds to step 220, waits a second predefined amount of time, and then returns to step 206 and proceeds as described above. In one embodiment, this second predefined amount of time is approximately five minutes, although, as with the predefined threshold for assessing displayed text, the second predefined amount of time may be sent to an alternate value in accordance with some desired result or level of performance. In another embodiment, this second predefined amount of time may be cut short if the sender's or the receiver's online status changes (e.g., the sender or the receiver goes offline, thereby terminating the instant messaging session, before it can be inferred that the receiver has viewed the instant message). In this case, the party that remains online may also receive a notice that the departing party has gone offline.

Alternatively, if the method 200 determines in step 216 that the amount of the instant message text that is displayed at least meets the predefined threshold, the method 200 proceeds to step 218 and adjusts a view ranking associated with the instant message. The view ranking is adjusted by some amount that corresponds to or reflects the amount of the instant message text that is displayed on the receiver's device display.

The method 200 then proceeds to step 222 and determines whether there has been user input (e.g., via a mouse, a keyboard, a touch screen, a key pad, a speech interface, a heat-sensing interface, a motion-sensing interface or other user interface) at the receiver's device following the receipt of the instant message (i.e., step 204). User input implies that the receiver is physically present at the receiver's device following receipt of the instant message, making it more likely that the receiver has viewed the instant message, especially if the instant message's window is displayed in at least partial view. Thus, if the method 200 determines in step 222 that there has been no user input following receipt of the instant message, the method 200 proceeds to step 220 as described above. The method 200 may repeat in this manner (e.g., after waiting in step 220) a plurality of times, e.g., until some view ranking can be reported to the sender of the instant message or until the process has repeated a maximum number of times. In one embodiment, this maximum number can be random or predefined, and may be defined by the sender of the instant message or by the receiver of the instant message. In one embodiment, if the method 200 has repeated the maximum number of times without generating a view ranking, the view ranking is automatically set to zero.

Alternatively, if the method 200 determines in step 222 that there has been user input following receipt of the instant message, the method 200 proceeds to step 224 and sends a message to the sender of the instant message indicating that the instant message has likely been viewed by the receiver. In one embodiment, the message sent to the sender provides a simple yes or no answer indicating whether or not the instant message has likely been viewed by the receiver (e.g., "message viewed" or "message not viewed"). In another embodiment, the message that is sent to the sender includes the view ranking or some other metric indicating the probability with which the instant message was viewed (e.g., 0.8 out of 1, or "It is more than likely that the instant message has been viewed"). In one embodiment, this view ranking could be incorporated into a user interface as a bar indicator or other visual indicator.

Referring back to step 210, if the method 200 determines that the instant message's window is displayed in full view on the receiver's device display, the method 200 proceeds to step 212 and sets the view ranking associated with the instant message to a maximum value (e.g. a value slightly less than, but not equal to, one). Thus, the likelihood that the receiver has viewed the instant message is greatest when the instant message is displayed in full view (as opposed to partial view or out-of-view) on the receiver's device display. The method 200 then proceeds directly to step 222 as described above. The method 200 terminates in step 226.

The method 200 thereby enables a sender of an instant message to infer whether the instant message has been viewed by the receiver, without requiring any explicit response or manual intervention from the receiver. By analyzing a plurality of criteria associated with the receiver's computing device, such as the amount of the instant message window that is displayed on the receiver's device display and whether the receiver's device has received any user (e.g., receiver) input, the likelihood that the receiver has not just received, but has viewed, the instant message can be inferred with a reasonable degree of certainty.

In addition, other criteria associated with the user's device may provide support for such an inference, including whether or not the instant message window is the active window on the user's device display (e.g., is the window that has input focus, as in the window $302_2$ of FIG. 3, whose task bar 304 is highlighted or darkened).

Figure 4:
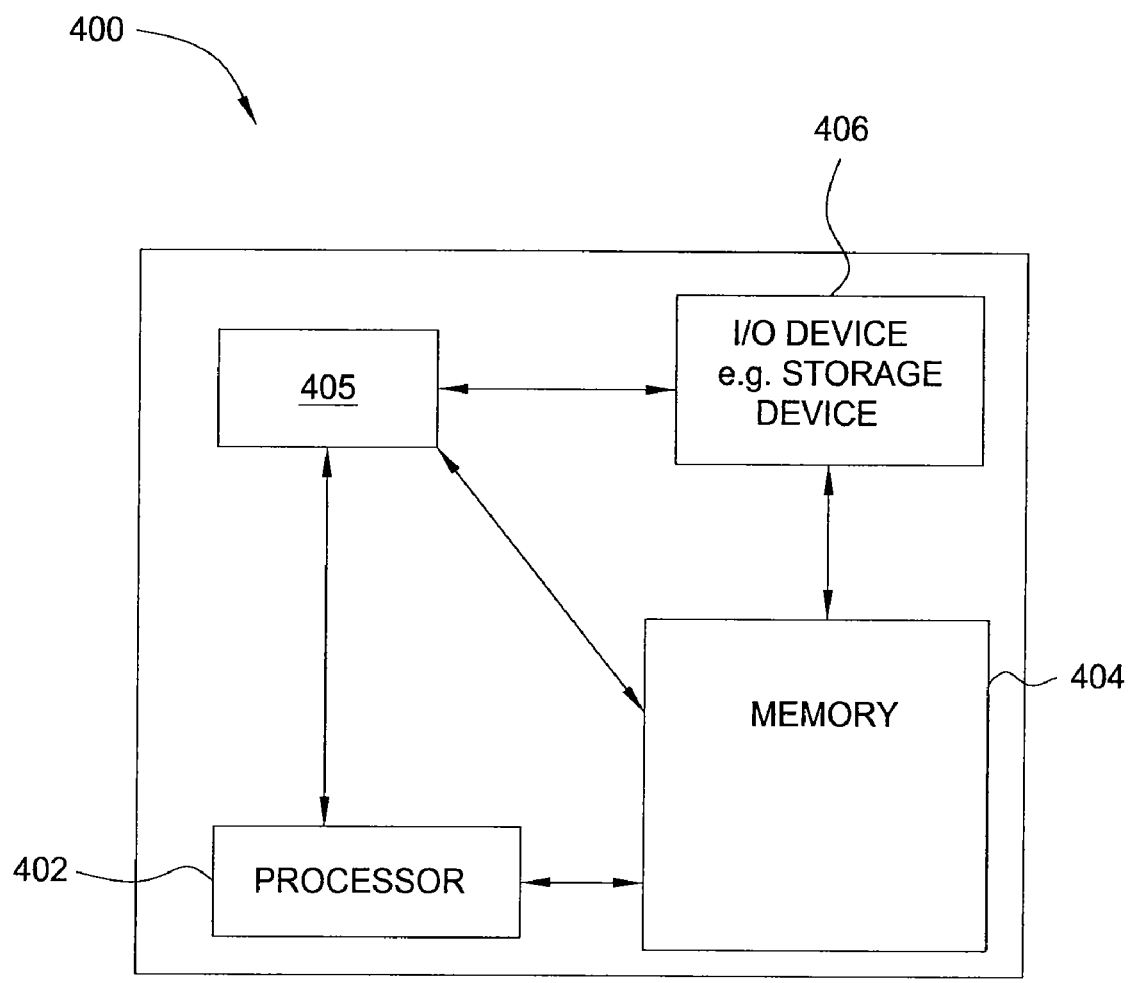
FIG. 4 is a high level block diagram of the read status inference system that is implemented using a general purpose computing device.

FIG. 4 is a high level block diagram of the read status inference system that is implemented using a general purpose computing device 400. In one embodiment, a general purpose computing device 400 comprises a processor 402, a memory 404, an inference module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the inference module 405 can be implemented as a physical device or subsystem that is coupled to a processor through a communication channel.

Alternatively, the inference module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the inference module 405 for inferring the read or view status of instant messages described herein with reference to the preceding Figures can be stored on a computer readable medium or carrier (e.g., RAM, magnetic or optical drive or diskette, and the like).

Thus, the present invention represents a significant advancement in the field of instant messaging systems. A method and apparatus are provided that enable confirmations to be sent to senders of instant messages indicating a likelihood that the instant messages have been viewed by the receivers. Criteria associated with the receiver's computing device, including input from the computing device's operating system, operating system's windows manager and the receiver him or herself, enable this likelihood to be automatically assessed without any explicit or manual input from the receiver.

While foregoing is directed to the preferred embodiment of the present invention, other and further embodiments of the invention may be devised without departing from the basic scope thereof, and the scope thereof is determined by the claims that follow.

The invention claimed is:

1. A method for conveying a view status of an instant message sent by a sender to a receiver, the method comprising:
    displaying said instant message on a first computing device operated by said receiver; and
    sending a message to a second computing device operated by said sender, said message indicating a probability that said receiver has viewed said instant message, wherein said probability is based at least in part on at least one message sent by a window manager to a window on a display of said first computing device, wherein said probability comprises a numerical ranking indicative of a likelihood that said instant message has been viewed by said receiver, and wherein a value of said numerical ranking is greater than zero but less than one and corresponds to a percentage of said instant message that is visible on said display of said first computing device.

2. The method of claim 1, wherein said probability is additionally based on an input from an operating system of said first computing device.

3. The method of claim 1, wherein said probability is additionally based at least in part on whether said instant message has input focus on said first computing device.

4. The method of claim 1, wherein said probability is additionally based on an input received by said first computing device from said receiver after said instant message has been received by said first computing device.

5. The method of claim 4, wherein said input comprises an input received via at least one of: a mouse, a keyboard, a touch screen, a key pad, a speech interface, a heat-sensing interface, or a motion-sensing interface.

6. The method of claim 1, wherein said probability is additionally based on both an amount of text in said instant message that is in view on said first computing device and an input received by said first computing device from said receiver after said instant message has been received by said first computing device.

7. The method of claim 1, wherein said sending comprises:
    indicating that said receiver has likely not viewed said instant message if a predefined amount of time expires without an indication that said receiver has viewed said instant message.

8. The method of claim 1, wherein said probability indicates that said receiver has likely viewed said instant message, and wherein said probability is computed in the absence of any explicit or manual input from the receiver.

9. The method of claim 1, wherein said probability is additionally based on an input from said receiver.

10. A non-transitory computer readable storage medium containing an executable program for conveying a view status of an instant message sent by a sender to a receiver, where the program performs steps of:
    displaying said instant message on a first computing device operated by said receiver; and
    sending a message to a second computing device operated by said sender, said message indicating a probability that said receiver has viewed said instant message, wherein said probability is based at least in part on at least one message sent by a window manager to a window on a display of said first computing device, wherein said probability comprises a numerical ranking indicative of a likelihood that said instant message has been viewed by said receiver, and wherein a value of said numerical ranking is greater than zero but less than one and corresponds to a percentage of said instant message that is visible on a display of said first computing device.

11. The non-transitory computer readable storage medium of claim 10, wherein said probability is additionally based an input from an operating system of said first computing device.

12. The non-transitory computer readable storage medium of claim 10, wherein said probability is based at least in part on whether said instant message has input focus on said first computing device.

13. The non-transitory computer readable storage medium of claim 10, wherein said probability is additionally based on an input received by said first computing device from said receiver after said instant message has been received by said first computing device.

14. The non-transitory computer readable storage medium of claim 13, wherein said input comprises an input received via at least one of: a mouse, a keyboard, a touch screen, a key pad, a speech interface, a heat-sensing interface, or a motion-sensing interface.

15. The non-transitory computer readable storage medium of claim 10, wherein said probability is additionally based on both an amount of text in said instant message that is in view on said first computing device and an input received by said first computing device from said receiver after said instant message has been received by said first computing device.

16. The non-transitory computer readable storage medium of claim 10, wherein said sending comprises:
   indicating that said receiver has likely not viewed said instant message if a predefined amount of time expires without an indication that said receiver has viewed said instant message.

17. The non-transitory computer readable storage medium of claim 10, wherein said probability indicates that said receiver has likely viewed said instant message, and wherein said probability is computed in the absence of any explicit or manual input from the receiver.

18. The non-transitory computer readable storage medium of claim 10, wherein said probability is additionally based on an input from said receiver.

19. Apparatus for conveying a view status of an instant message sent by a sender to a receiver, the apparatus comprising:
   means for displaying said instant message on a first computing device operated by said receiver; and
   means for sending a message to a second computing device operated by said sender, said message indicating a probability that said receiver has viewed said instant message, wherein said probability is based at least in part on at least one message sent by a window manager to a window on a display of said first computing device, wherein said probability comprises a numerical ranking indicative of a likelihood that said instant message has been viewed by said receiver, and wherein a value of said numerical ranking is greater than zero but less than one and corresponds to a percentage of said instant message that is visible on a display of said first computing device.

20. The apparatus of claim 19, further comprising:
means for assessing said probability.

* * * * *